United States Patent [19]

Nomura et al.

[11] Patent Number: 4,980,676

[45] Date of Patent: Dec. 25, 1990

[54] ELECTRONIC APPARATUS WITH KEYBOARD

[75] Inventors: Hideo Nomura, Yokohama; Motoji Takemoto, Fujisawa, both of Japan

[73] Assignee: International Business Machines Corporation, Armonk, N.Y.

[21] Appl. No.: 407,080

[22] Filed: Sep. 14, 1989

[30] Foreign Application Priority Data

Sep. 22, 1988 [JP] Japan .................................. 63-236292

[51] Int. Cl.$^5$ ............................................. B41J 11/56
[52] U.S. Cl. ................................... 340/700; 340/711; 248/918; 400/682; 312/208
[58] Field of Search ...................... 340/711, 706, 700; 248/918, 916, 917; 400/682, 685, 691, 693, 680, 681; 341/22; 364/708; D14/114, 115; 312/208; 434/432

[56] References Cited

U.S. PATENT DOCUMENTS

| | | | |
|---|---|---|---|
| 2,418,785 | 9/1945 | Mills | 400/682 |
| 4,704,604 | 3/1987 | Fuhs | 400/682 |
| 4,773,783 | 9/1988 | Dickie | 400/682 |
| 4,883,376 | 11/1989 | Iwase et al. | 340/711 |

OTHER PUBLICATIONS

IBM Technical Disclosure Bulletin, vol. 32, No. 9A Feb. 1990; pp. 56-57.

*Primary Examiner*—Alvin E. Oberley
*Assistant Examiner*—Chanh Nguyen
*Attorney, Agent, or Firm*—Laurence R. Letson

[57] ABSTRACT

A pair of leg members, each of which has a front end forming a curved surface and a recess formed to continue the front end, are provided on both sides of a keyboard respectively, a bottom is formed so that it projects forward at the lower portion of the case, and a pair of recesses are provided on both sides of the bottom respectively. Each of recesses has a receiving surface, on which the curved surface of the front end of the leg members can slide, and an end, which can fit into the recess of the leg member. When the keyboard is pivoted from the upright position to a surface on which an electronic apparatus is positioned, on a predetermined point of the leg member as a fulcrum by sliding the curved surface of the front end of the leg members on the receiving surface formed on the recess in the bottom, the recess in the leg member is fitted into the end of the recess in the bottom to provide a predetermined angle for the keyboard.

6 Claims, 8 Drawing Sheets

ELECTRONIC APPARATUS WITH KEYBOARD

FIELD OF THE INVENTION

This invention relates to an electronic apparatus with a keyboard such as a transportable personal computer in which the keyboard can be stored in a case in an upright position in such a manner that its surface mounted with keys faces toward the inside.

PRIOR ART

Japanese Published Unexamined Utility Model Application (PUUMA) No. 60-158228 [Utility Model Application (UMA) No. 59-45620] discloses a storing mechanism for a keyboard not in use in which each lower front side of a display case is removably connected to each rear side of the keyboard with a projecting shaft, a groove for guiding the projecting shaft, and a fitting area provided at the end of the groove and fitted with the projecting shaft, so that the keyboard, when it is not in use, can be stored as a lid for a display screen.

Japanese Published Unexamined Utility Model Application (PUUMA) No. 63-39734 [Utility Model Application (UMA) No. 61-129870] discloses a keyboard with a display in which a projection is formed on either a molded keyboard or a molded body of a display, a rotating projection support member is formed on the other, in which a clearance allowing press fitting of the projection, and a space for rotation allowing rotation of the projection therein after the press fitting are provided, and a combination of the projection and the rotating projection support member is arranged to function as a hinge.

BACKGROUND OF THE INVENTION

In both of the above two prior arts, the keyboard is mounted on the display in such a manner that it is pivoted and stored so that its surface mounted with keys faces inside. However, there is a problem in that the keys are difficult to operate because, when the keyboard is pivoted from the display to a surface on which the display is positioned, it becomes parallel to the display positioning surface.

The invention intends to solve such a conventional problem, and to provide an electronic apparatus with a keyboard such as a transportable personal computer in which the keyboard can be stored in a case in an upright position in such a manner that its surface mounted with keys faces toward the inside, so that, when the keyboard is pivoted from its upright position to an electronic apparatus positioning surface, it can be provided with a predetermined inclination.

SUMMARY OF THE INVENTION

To attain the above objective, in accordance with this invention, a pair of leg members, each of which has a front end forming a curved surface and a recess formed to continue the front end, are provided on both sides of a keyboard respectively, a bottom is formed so that it projects forward at the lower portion of the case, and a pair of recesses are provided on both sides of the bottom respectively. Each of recesses has a receiving surface, on which the curved surface of the front end of the leg members can slide, and an end, which can fit into the recess of the leg member.

Therefore, when the keyboard is pivoted from the upright position to a surface on which an electronic apparatus is positioned, on a predetermined point of the leg member as a fulcrum by sliding the curved surface of the front end of the leg members on the receiving surface formed on the recess in the bottom, the recess in the leg member is fitted into the end of the recess in the bottom to provide a predetermined angle for the keyboard.

EMBODIMENT

Figure 1:
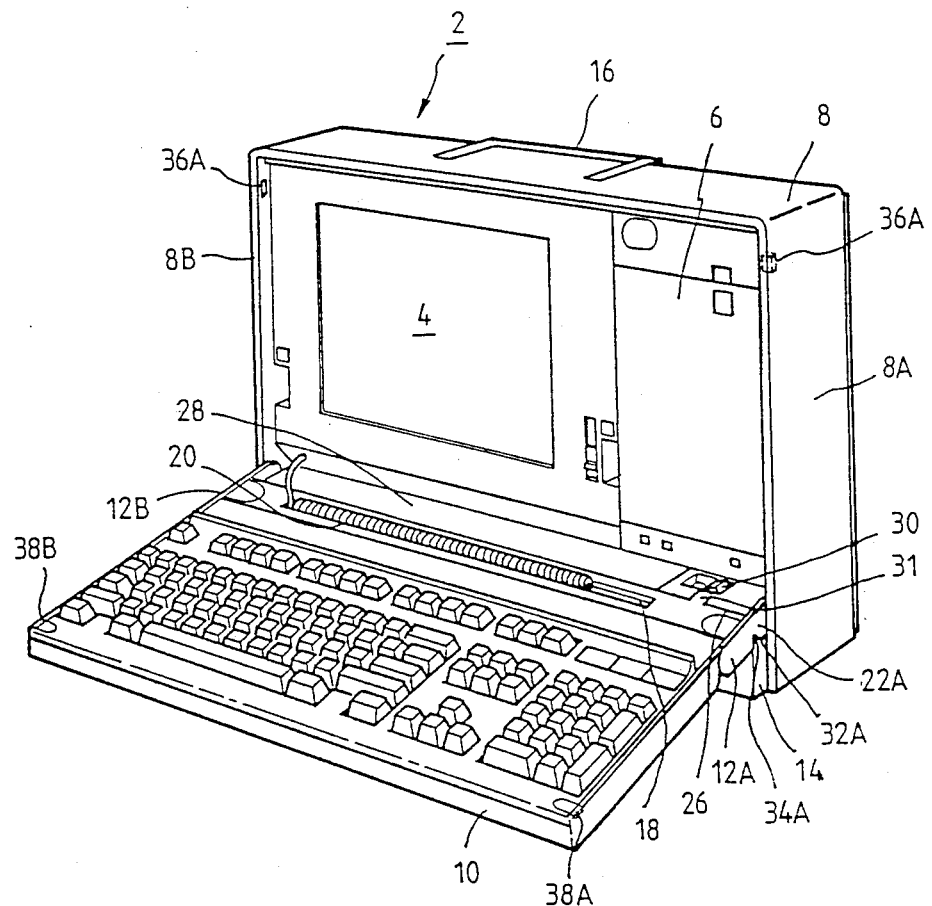
FIG. 1 is a perspective view of a transportable personal computer in which a keyboard is drawn out according to an embodiment of the invention.
Figure 2:
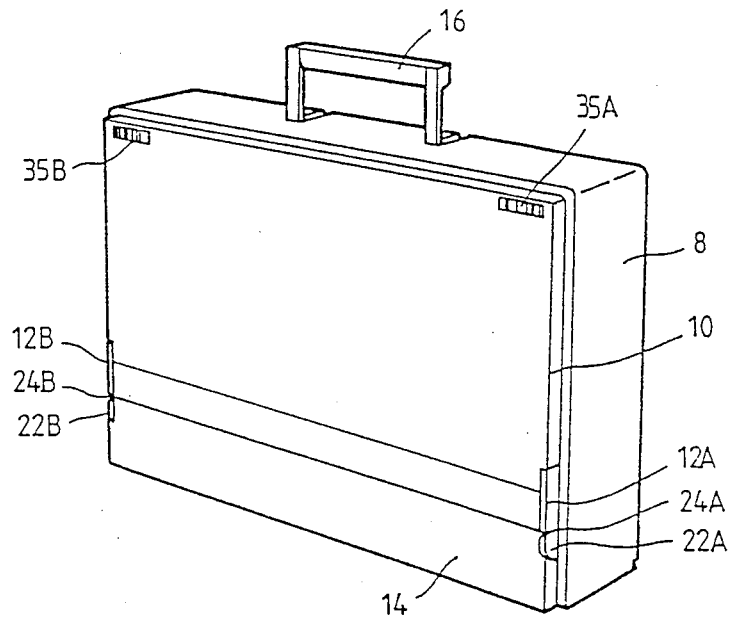
FIG. 2 is a perspective view of the transportable personal computer in which the keyboard is mounted on its case according to an embodiment of the invention.

FIGS. 1 and 2 show an embodiment where the invention applies to a transportable personal computer. FIG. 1 shows a state where a keyboard is taken out from a case and rests on a positioning surface on which the transportable personal computer is positioned, while FIG. 2 shows the transportable personal computer in a state where the keyboard is mounted on the case. In these figures, the case 8 of the transportable personal computer 2 is incorporated with a flat display 4 consisting of a plasma display, and a floppy disk drive 6. The keyboard 10 is arranged to be freely mounted on and dismounted from the case 8. In a state where the keyboard 10 is mounted on the case 8, as shown in FIG. 2, it constitutes a part of the case, so that the transportable personal computer 2 can be carried around by a handle 16.

Figure 3:
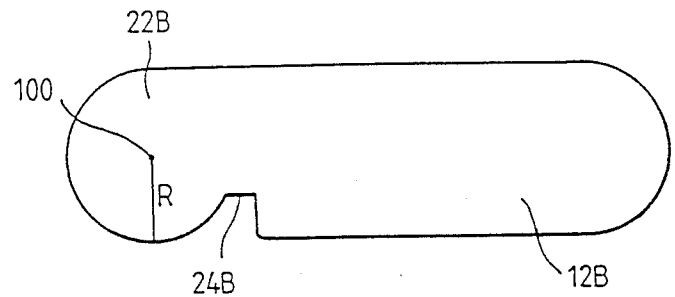
FIG. 3 is a side view illustrating the leg members of the keyboard.

A pair of leg members 12A and 12B are provided at the rear of one side and the other of the keyboard 10 respectively. As shown in FIG. 3, the leg members 12A and 12B have round front ends 22A and 22B, as well as recesses 24A and 24B respectively, to continue these front ends. Preferably, the round front end 22B has a radius of R same as the width of the side of the keyboard 10. This ensures that, when the keyboard 10 is mounted on the case 8, the leg members 12A and 12B do not project, and sufficient strength for supporting the keyboard is provided for the leg members. On the other hand, the lower portion of the case 8 is provided with a bottom 14 so that it projects forward from the sides 8A and 8B of the case.

A pair of recesses 18A and 18B are formed on one side and the other side of the bottom 14 respectively.

Figure 4:
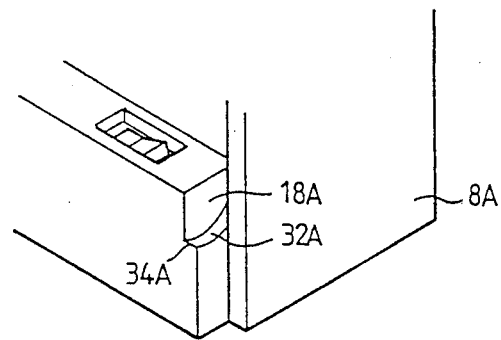
FIG. 4 is a partial perspective view of a recess formed in a side of the case bottom.

FIG. 4 shows the recess 18A in the bottom 14 formed on the side 8A of the case 8. The recess 18A has a receiving surface 32A on which the curved surface of the front end 22A of the leg member 24A can slide, and an end 34A that can fit into the recess 24A of the leg member 12A. Similarly, the recess 18B in the bottom 14 formed on the side 8B of the case 8 also has a receiving surface 32B on which the curved surface of the front end 22B of the leg member 12B can slide, and an end 34B that can fit into the recess 24B for the leg member 12B (see FIG. 10).

The front ends 22A and 22B of the leg members 12A and 12B are mounted on the keyboard 10 so as to project from its rear end 26. They are arranged in such a manner that, when the keyboard 10 is mounted on the case 8 in the upright position as shown in FIG. 2, they prevent the rear end 26 of the keyboard 10 from contacting the upper surface 28 of the bottom 14 of the case 8.

A power switch 30 is provided on the upper surface 28 of the bottom 14. A projection 31 is provided on the rear end 26 of the keyboard 10 at a location corresponding to that of the power switch 30 so that the power switch 30 can be turned off when the keyboard 10 is mounted in the upright position as shown in FIG. 2. That is, the projection 31 pushes the power switch 30, and turns it off.

Provided at the rear of the surface of the keyboard 10 mounted with the keys is a groove 18 for receiving a cord 20 so that the cord does not preclude the rotation of the keyboard 10, that is, the mounting or dismounting operation.

Figure 5:
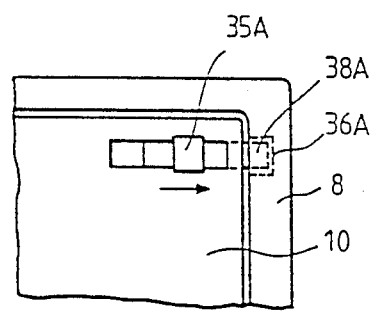
FIG. 5 is a partial back view illustrating a stopper actuating slide knob to be provided on the back of the keyboard.

A stopper actuating slide knob 35A is provided at the right front portion of the back of the keyboard 10. Correspondingly, a stopper receiving recess 36A is formed in the side 8A of the case 8. As shown in FIG. 5, when the stopper actuating slide knob 35A is slid to the right while the keyboard 10 is in the upright position, a stopper 38A enters into the recess 36A to prevent the keyboard 10 from removal from the case 8. Similarly, a stopper actuating slide knob 35B is also provided at the left front portion of the back of the keyboard 10. Correspondingly, a stopper receiving recess 36B is formed in the side 8B of the case 8.

Figure 6:
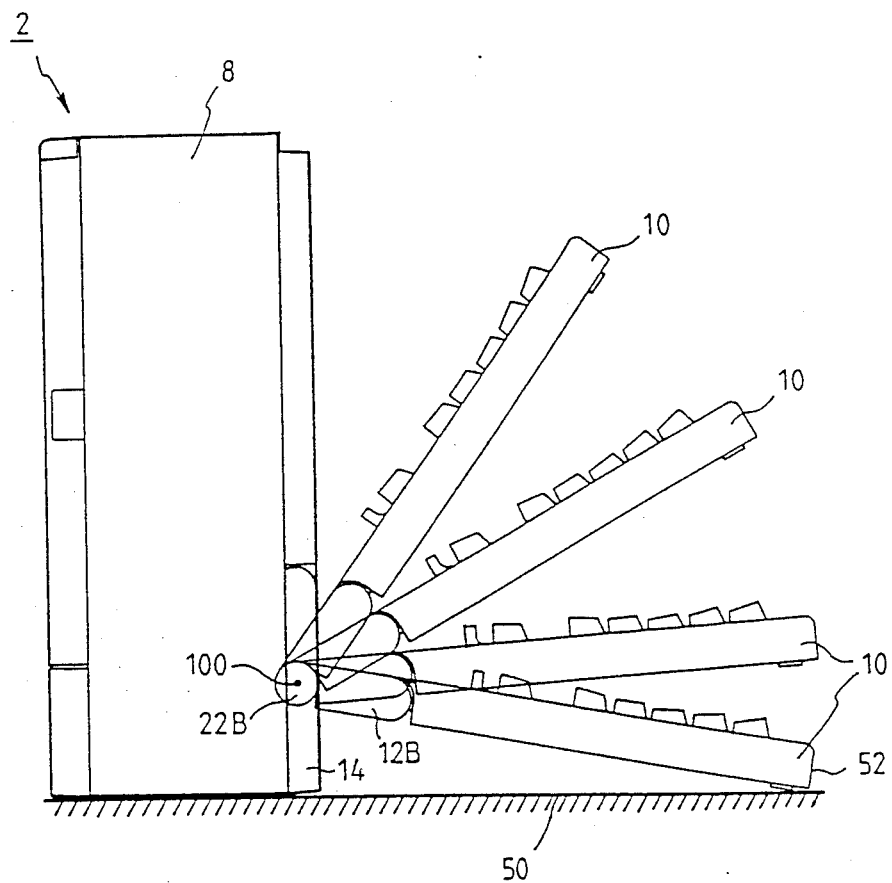
FIG. 6 is a side view illustrating pivoting of the keyboard.
Figure 7:
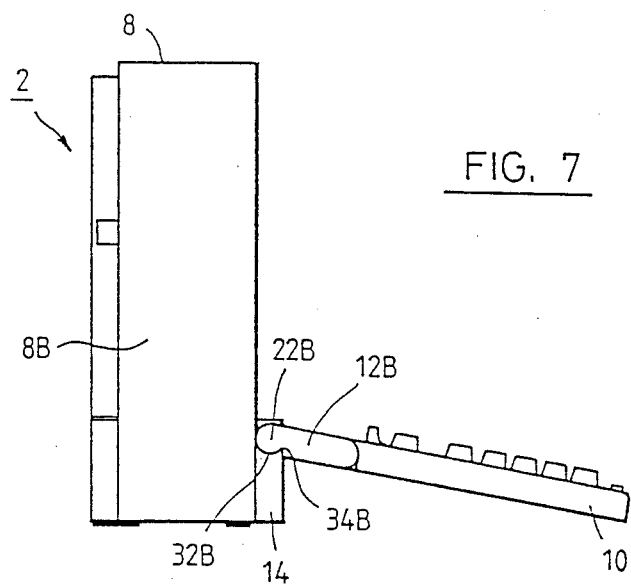
FIG. 7 is a side view illustrating a state where the keyboard completes its pivoting and is positioned on a surface where the personal computer is positioned.

When the keyboard 10 mounted upright on the case 8 as shown in FIG. 2 is to be dismounted, the stopper actuating slide knobs 35A and 35B mounted on the back of the keyboard 8 are first slid to the left and right, respectively, to extract the stoppers from the recesses 36A and 36B. Then, as shown in FIG. 6, the keyboard 10 is pivoted toward the positioning surface 50, on which the transportable personal computer 2 is positioned, on the center 100 of the front ends 22A and 22B of the leg members 12A and 12B of the keyboard 10 as a fulcrum by sliding the curved surface of front ends 22A and 22B of the leg members 12A and 12B of the keyboard 10 on the receiving surface 32A and 32B of the bottom 14. When the front edge 52 of the keyboard 10 contacts the positioning surface 50, the recesses 24A and 24B of the leg members 12A and 12B can fit into the ends 34A and 34B of the recesses in the bottom 14 of the case 8 to hold a predetermined inclination for the keyboard 10 as shown in FIG. 7.

Figure 8:
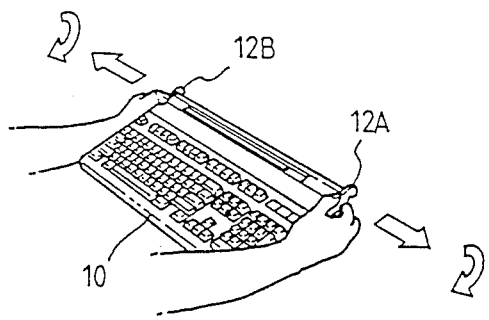
FIG. 8 is an illustration of an operation used to make the leg members pivotable.
Figure 9:
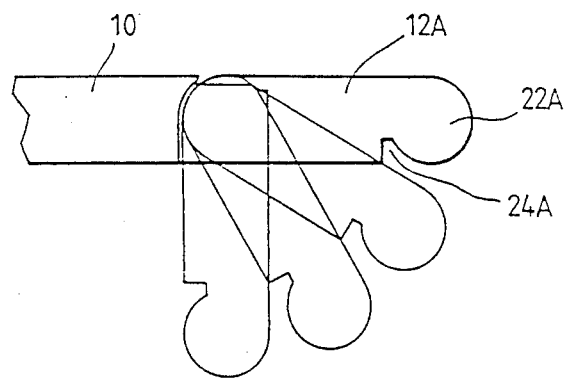
FIG. 9 is a side view illustrating pivoting of the leg members.

As shown in FIG. 8, the leg members 12A and 12B can be pivoted by 90° to the keyboard 10 as shown in FIG. 9 by moving it to the right and left, respectively.

Figure 10:
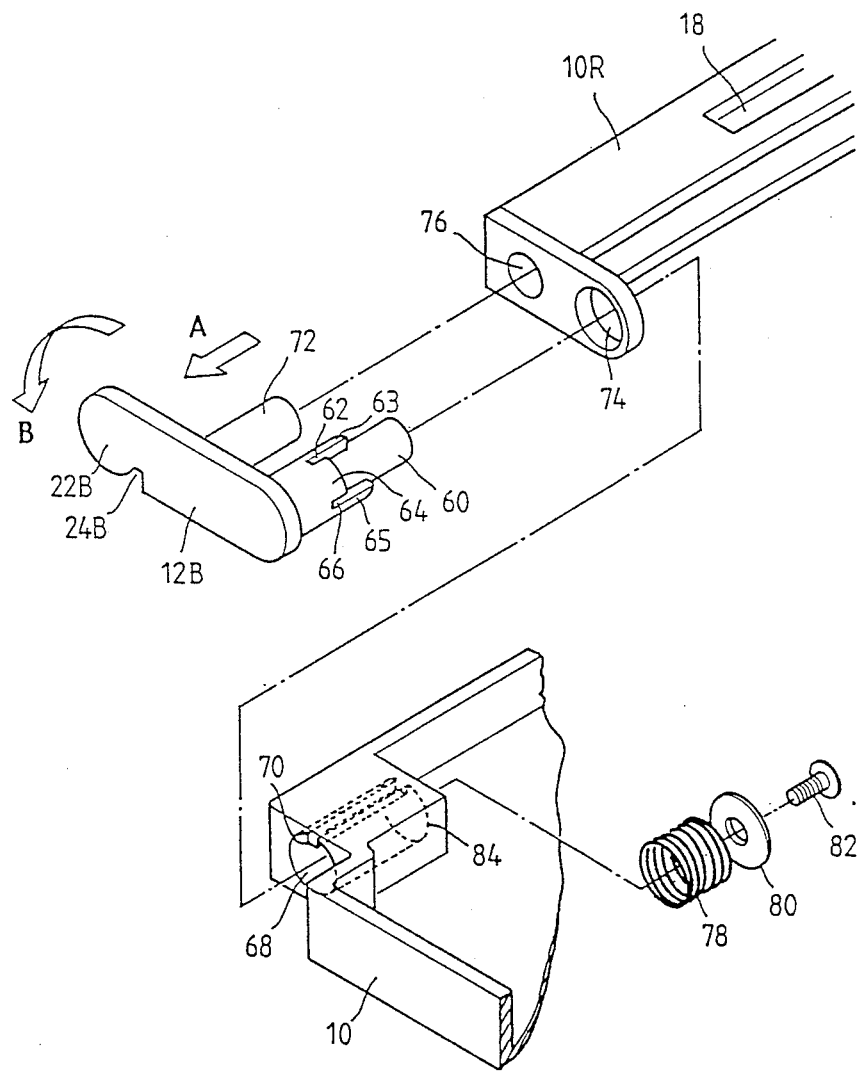
FIG. 10 is an exploded perspective view illustrating an example of a mechanism to make the leg members pivotable.

FIG. 10 shows a mechanism provided in the leg member 12B for allowing the pivoting of the leg members. Projections 63 and 65 for restricting the rotation angle, and a projection 64 for restricting the rotation, located between these projections 63 and 65, are provided on the outer periphery of a pivoting shaft 60 opposite to the front end 22B of the leg member 12B. Grooves 62 and 66 for fixing the leg members are formed at locations between the pivoting angle restricting projection 63 and the pivoting restricting projection 64, and between the pivoting angle restricting projection 65 and the pivoting restricting projection 64, respectively. The pivoting shaft 60 passes through an opening 74 in a rear member 10R, in which the cord receiving groove 18 of the keyboard 10 is formed, and a cavity 68 formed in the keyboard 10. The portion of the rotating shaft 60 projected from the cavity 68 is wound with a coil spring 78. A threaded hole is formed in the pivoting shaft 60. A ring 80 is fastened by a screw 82 on the front end of the pivoting shaft 60 wound with the coil spring 78. At this time, the groove 62 is in a state where it fits a projection 70 in the cavity 68, and the coil spring 78 is between a wall 84 and the ring 80 to bias the leg member 12B in the direction opposite to that of arrow A.

To pivot the leg member 12B, it is drawn out along the pivoting shaft 60 in the direction of the arrow A to release engagement of the groove 62 and the projection 70. Thus, the leg member 12B can pivot in the direction of an arrow B. However, when it is pivoted by 90°, the projection 70 abuts against the projection 65. At that moment, if the leg member 12B is released, the projection 70 fits into the groove 66 to fix the leg member 12B at a position after rotation of 90°. In FIG. 10, a shaft 72 of the leg member 12B is inserted into the cavity 76 in the rear member 10R of the keyboard 10 to cause the rear member 10R to pivot by 90° as the leg member 12B rotates.

Figure 11:
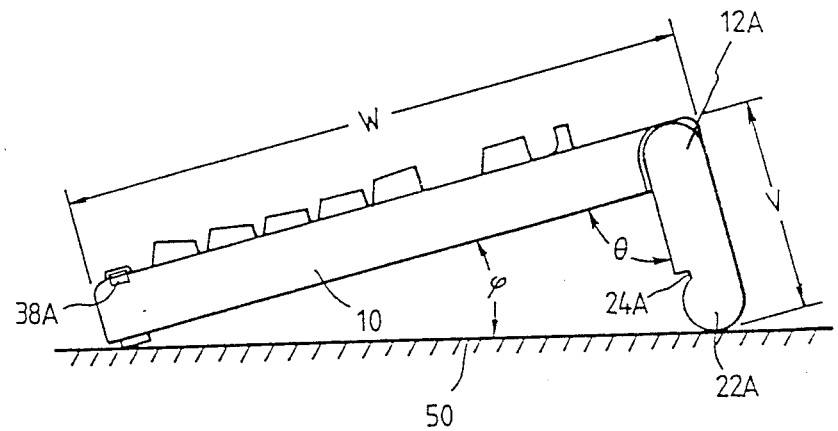
FIG. 11 is a side view illustrating the keyboard in a state where the leg members are pivoted by 90°.
Figure 12:
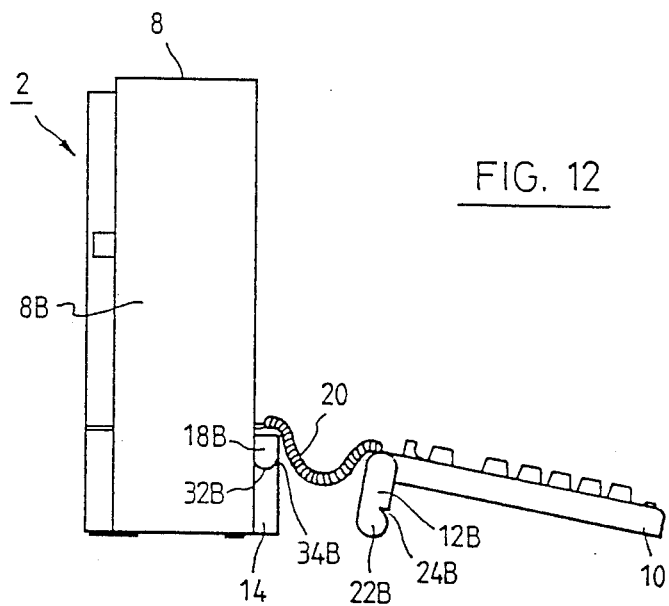
FIG. 12 is a side view illustrating the method of using the keyboard in the state of FIG. 11.

FIG. 11 shows a state where the keyboard 10 is positioned on the surface for positioning the personal computer 2 after pivoting of the leg members 12A and 12B by 90°. Because the angle $\theta$ between the keyboard 10 and the leg member 12A is 90°, the angle $\phi$ of inclination of the keyboard 10 to the positioning surface 50 can be determined if the length W of the side of the keyboard and the length V of the leg member 12A are determined. FIG. 12 shows a state where the keyboard 10 of the personal computer 2 is in use after rotation of the leg member 12A by 90° as in FIG. 11.

As described, according to the embodiment, the first inclination angle of the keyboard 10 can be set by fitting the recesses 24A and 24B of the leg members 12A and 12B into the ends 34A and 34B of the recesses in the bottom 14, respectively, while maintaining the leg members 12A add 12B parallel to the keyboard 10 (see FIG. 7). The second inclination angle of the keyboard 10 can be set by pivoting the leg members 12A and 12B by 90° (see FIG. 12).

Although, in the above embodiment, the front ends 22A and 22B of the leg members 12A and 12B are formed to be round, they do not necessarily have to be round, but may be of any shape as long as curved surfaces are formed on the front ends 22A and 22B allowing them to slide on the receiving surfaces 32A and 32B of the bottom 14 to rotate the keyboard 10.

In addition, the mechanism causing the leg members 12A and 12B to pivot may be that disclosed in Japanese Published Unexamined Utility Model Application (PU-UMA) No. 61-164533 [Utility Model Application (UMA) No. 60-47078], Japanese Published Unexamined Utility Model Application (PUUMA) No. 62-28241 [Utility Model Application (UMA) No. 60-120478], or Japanese Published Unexamined Utility Model Application (PUUMA) No. 59-166324[Utility Model Application (UMA) No. 58-60550] in addition to that shown in FIG. 10. This means that any mechanism enabling the leg members 12A and 12B to pivot by a predetermined angle, and to be fixed at a predetermined position may be employed.

Furthermore, the invention is not limited to an arrangement where the leg members 12A and 12B can be pivoted, but includes an arrangement where the leg members 12A and 12B are fixed. It is because, even if they are fixed, a predetermined inclination can be provided for the keyboard 10 by fitting the recesses 24A and 24B of the leg members 12A and 12B into the ends 34A and 34B of the recesses in the bottom 14, respectively.

Also, although the above embodiment relates to a transportable personal computer, it will be obvious to persons skilled in the art that it can be applied to a desk top personal computer.

In addition, it will be obvious to persons skilled in the art that the invention is not limited to a personal computer, but can be generally applied to a larger computer and other electronic apparatus such as a word processor.

ADVANTAGES OF THE INVENTION

As clearly seen from the above description, according to the invention, curved surfaces are formed on the front ends of a pair of leg members each of which is provided on each side of a keyboard, recesses are formed to continue these front ends, and, receiving surfaces, on which the curved surfaces on the front ends of the leg members can slide, and ends, which can fit into the recesses in the leg members, are formed on each side of the bottom projecting forward on each side of a case at its lower portion. Therefore, the recesses of the leg members fit into the ends of the recesses in the bottom when the curved surfaces at the front ends of the leg members slide on the receiving surfaces formed on the bottom to pivot the keyboard to the surface on which an electronic apparatus is positioned, so that a desired inclination can be provided.

We claim:

1. An electronic apparatus with a keyboard in which the keyboard can be mounted in the upright position on a case in such a manner that the surface mounted with keys of the keyboard faces inside, comprising:
    a pair of leg members, one of which is provided on one side of said keyboard, the other of which is provided on the other side of said keyboard, each of which has a front end forming a curved surface and a recess formed to continue said front end,
    a bottom formed at the lower portion of said case to project forward from each side of said case, and
    a pair of recesses formed at each side of said bottom, each of which has a receiving surface, on which the curved surface of the front end of said leg member can slide, and an end capable to fit into the recess in said leg member,
    said keyboard is pivoted from the upright position to a surface on which said electronic apparatus is positioned, and a predetermined point of said leg member as a fulcrum and sliding the curved surface of the front end of said leg member on the receiving surface on the recess formed in said bottom, when said keyboard reaches said surface on which electronic apparatus is positioned, the recess in said leg member is fitted into the end of the recess in said bottom to hold a predetermined inclination for said keyboard.

2. An electronic apparatus with a keyboard claimed in claim 1, wherein said electronic apparatus is a computer.

3. An electronic apparatus with a keyboard claimed in claim 1, wherein a side of the curved front end of said leg member has a round shape.

4. An electronic apparatus with a keyboard claimed in claim 1, wherein said leg member projects from the rear end of said keyboard.

5. An electronic apparatus with a keyboard claimed in claim 1, wherein said leg member is rotatably mounted on said keyboard.

6. An electronic apparatus with a keyboard claimed in claim 1, wherein a projection is provided on the rear end of said keyboard, a power switch being mounted on the top surface of said bottom, whereby said projection turns off said power switch when said keyboard is mounted in the upright position on said case.

* * * * *